Patented July 30, 1940

2,209,829

UNITED STATES PATENT OFFICE

2,209,829

ARC WELDING ELECTRODE

Thomas J. Rasmussen and Joseph H. Humberstone, Schenectady, N. Y., assignors to General Electric Company, a corporation of New York No Drawing. Application December 28, 1938, Serial No. 248,103

2 Claims. (Cl. 219—8)

Our invention relates to an improved metallic arc welding electrode.

In metallic arc welding, an arc is maintained between the work to be welded and a rod, wire or strip of metal, usually referred to as an electrode. During welding the electrode is fused or vaporized or both and the metal thereof deposited upon and welded to the work as the electrode is fed toward the work to maintain the arc.

The quality of the weld metal deposited by such a process depends to a large extent on the influence of certain elements or compounds associated with the electrode, usually in the form of a coating. Electrodes so coated are commonly referred to as flux coated electrodes.

When heavy coatings of flux are applied to electrodes, these coatings serve several purposes. One of the purposes of the coating is to form a desired slag for covering the molten weld metal. The coating also forms a shroud or crucible-like tip portion during welding which protects the electrode metal during its transfer from the electrode to the weld. Certain ingredients of the flux coating also produce an ambient gaseous shield which tends to exclude the oxygen and nitrogen of the air from contact with the weld as well as the metal being transferred from the electrode to the weld. In view of the results obtained with electrodes having a heavy coating of flux, they are frequently referred to as electrodes of the shielded arc type.

It is an object of our invention to provide an improved fluxing material which is particularly applicable as a heavy coating for electrodes of the shielded arc type.

It is a further object of our invention to provide an electrode in which certain ingredients cooperate with one another in controlling the drying of the flux on the electrode so that the coating as dried is free from cracks or blisters, and adheres firmly to the electrode.

Further objects of our invention will appear from the following description of the fluxing composition and its use as a coating on electrodes of the shielded arc type.

In accordance with our invention the flux has substantially the following composition:

| | Per cent by weight |
|---|---|
| Rutile | 43.50 |
| Magnesite (uncalcined) | 4.83 |
| Feldspar | 13.50 |
| Sodium silicate | 25.05 |
| Ferro-manganese | 8.68 |
| Finely divided cellulosic material | 2.89 |
| Dextrine | 1.55 |

The ingredients of this flux may be varied by as much as 10 per cent without seriously affecting its qualities.

The solid ingredients are reduced to a finely powdered condition and mixed before adding the other ingredients and the paste resulting from a combination of all the ingredients is thoroughly mixed in order to produce a composition of uniform character.

The feldspar is preferably a potassium feldspar. The sodium silicate employed preferably has a $Na_2O:SiO_2$ ratio of 1:3.25 and a specific gravity of about 42° Baumé. The ferro-manganese contains preferably from 78 to 82 per cent manganese, from 5.5 to 6.5 per cent carbon, from 2.0 to 5.0 per cent silicon, and is low in phosphorous, preferably .1 per cent.

The finely divided cellulosic material in combination with dextrine are used to control the drying of the electrode. The dextrine slows up the drying rate by retarding the initial skin formation on the outer surface of the flux coating and the finely divided cellulosic material serves as an agency for conducting moisture from the inner portions of the flux coating to its outer exposed surface portions. Both of these materials also have a function in the flux in that they supply a desired amount of carbonaceous material. The finely divided cellulosic material is preferably wood flour, alpha flock, or alpha cellulose although equivalent materials may be used.

The flux composition above disclosed has consistency rendering it suitable for application to the electrodes by an extrusion process. As above stated, the electrode is applied as a heavy coating, for example a 3/32" electrode being coated so that its outside diameter is from .125" to .127" in diameter, and a 3/8" electrode being coated so that its outside diameter is from .471" to .474" in diameter.

When the flux is applied to a mild steel electrode having carbon .10 to .15, manganese .45 to .65, phosphorous .04 maximum, and sulphur .05 maximum, all weld metal samples as melted (not stress relieved) have the following characteristics:

| | | |
|---|---|---|
| U. T. S. (lb. per sq. in.) | 72,900 | 71,200 |
| Yield point (lb. per sq. in.) | 60,400 | 59,900 |
| Percent elongation in 2 in. | 22.0 | 22.5 |
| Percent reduction of area | 40.7 | 29.2 |

The above samples were made with a 3/16" electrode welding in the flat position.

The slag produced by the coating on this electrode is dark, heavy, and tends to be basic in nature. It has little tendency to glassiness and does not include many holes. It has a high surface tension as compared to reversed polarity all position heavily coated electrodes, a high melting temperature, and is quite fluid.

Electrodes coated with my flux composition operate successfully with either direct current (straight polarity) or alternating current. They are easy to handle, undercutting is easily avoided, the spatter loss is low, the slag is easily removed, and the weld bead is smooth. These electrodes are particularly useful for high speed single-pass welding and for welding where the fit-up is likely to be poor. They may be used for multiple-pass arc welding of mild steel in any position. The ductility of the deposit is unusually good and the resistance to corrosion is comparable to that of mild steel.

The above recitation of flux ingredients is to be understood as referring to the ingredients specified exclusive of other materials which may be added to the flux. It is entirely compatible with the present invention to add certain other materials without interfering with the interaction of the above recited ingredients. It is also to be understood that the flux is not necessarily employed in the specific manners above described and flux coatings of greater or less thickness than those above referred to may be used.

It is also to be understood that the combination of finely divided cellulosic material with dextrine for controlling the drying of the flux coating may be used with fluxes of compositions other than that recited above where a water solution of a soluble silicate of an alkaline metal is used as one of the principal ingredients of the flux. Liquid sodium silicate and liquid potassium silicate are most commonly used. The finely divided cellulosic material preferably constitutes about two to three per cent of the flux composition and the dextrine about one to two per cent thereof, although it is apparent that variations will be necessary depending on the character of the flux composition as determined by its several ingredients.

What we claim as new and desire to secure by Letters Patent of the United States is:

1. An arc welding electrode having a flux coating containing a water solution of a soluble silicate of an alkaline metal as one of its principal ingredients in combination with from two to three per cent of finely divided cellulosic material and one to two per cent of dextrine.

2. An arc welding electrode having a flux coating which as applied to the electrode has within a variation of about 10 per cent the following composition:

| | Per cent by weight |
|---|---|
| Rutile | 43.50 |
| Magnesite (uncalcined) | 4.83 |
| Feldspar | 13.50 |
| Sodium silicate | 25.05 |
| Ferro-manganese | 8.68 |
| Finely divided cellulosic material | 2.89 |
| Dextrine | 1.55 |

THOMAS J. RASMUSSEN.
JOSEPH H. HUMBERSTONE.